(12) United States Patent
Su

(10) Patent No.: US 6,299,190 B1
(45) Date of Patent: Oct. 9, 2001

(54) FRAME FOR A MOTORBIKE FRONT FORK

(76) Inventor: Chi-Tai Su, No. 18, Lane 242, Wen-Shen Road, Tainan City (TW)

( * ) Notice: Subject to any disclaimer, the term of this patent is extended or adjusted under 35 U.S.C. 154(b) by 0 days.

(21) Appl. No.: 09/565,463

(22) Filed: May 5, 2000

(51) Int. Cl.[7] .................................................. B62K 21/02
(52) U.S. Cl. ............................................................ 280/279
(58) Field of Search ..................................... 280/279, 280

(56) References Cited

U.S. PATENT DOCUMENTS

| | | | |
|---|---|---|---|
| 3,556,557 | * | 1/1971 | Blair . |
| 3,811,705 | * | 5/1974 | D'Ambra ............................. 280/279 |
| 4,512,592 | * | 4/1985 | Yoshioka ............................... 280/279 |
| 5,603,521 | * | 2/1997 | Bontrager ............................. 280/279 |

* cited by examiner

*Primary Examiner*—Kevin Hurley

(57) ABSTRACT

A frame for a motorbike front fork includes a first board and a second board which is connected to the first board by a rod. Two legs of the front fork extend through a first board and are engaged with a second board. The first hoard has two holes with tapered inner periphery and the second board has two tapered recesses for the two legs engaged therewith. Two pairs of tapered clamping members are respectively engaged with the two tapered recesses and the two tapered holes. Each tapered clamping member has a threading ring mounted thereto and the threading ring is engaged with the tapered holes and the tapered recesses so as to narrow the clamping members and securely position the legs.

4 Claims, 7 Drawing Sheets

FRAME FOR A MOTORBIKE FRONT FORK

FIELD OF THE INVENTION

The present invention relates to a frame for a motorbike front fork and includes two boards wherein each board has two tapered holes with which two legs of the front fork engaged. A tapered clamp ring is mounted to each leg and a threading ring is mounted to the tapered clamp and the threading ring is threadedly engaged with an inner threaded portion of the tapered hole.

BACKGROUND OF THE INVENTION

A conventional frame for a motorbike front fork is shown in FIG. 7 and generally includes a first board 71 and a second board 72, two legs 73 of the front fork extending through the two boards 71 and 72. Each of the first board 71 and the second board 72 is a triangle board and tow peaks of each board 71/72 has a circular portion so that there is enough area to let the two legs 73 respectively extend through the circular portions. Each circular portion on the first/second board 71/72 has a hole 711/721 and a slit 712/722 is defined in the circular portion and communicates with the hole 711/721. The slit 712/722 defines two ends of the circular portion so that when the leg 73 is received in the hole 711/721, a bolt 74 extends laterally through one end from outside of the circular portion, passes through the slit 712/722 and is threadedly engaged with the other end to securely clamp the leg 73. It is experienced that the connection between the first board 71, the second board 72 and the two legs 73 is not secured enough especially when riding on a serrated road. That is because the bolts 74 cannot provide sufficient clamping force to clamp the legs 73.

The present invention intends to provide a frame for a motorbike front fork and the two legs of the front fork are securely connected to the two boards by tapered clamping rings cooperated with threading rings.

SUMMARY OF THE INVENTION

In accordance with one aspect of the present invention, there is provided a frame for a motorbike front fork and comprising a first board and a second board which is connected to the first board by a connection rod. Two first tapered recesses defined in a bottom of the first board and a first inner threaded portion is defined in an inner periphery of each first tapered recess. The second board has two holes defined therethrough. Two second tapered recesses are defined in a bottom of the second board and respectively communicate with the two holes. A second inner threaded portion is defined in an inner periphery of each second tapered recess.

Two legs of the front fork extend through the two holes and are engaged with the two first tapered recesses. Four clamping members are respectively mounted to the two legs and engaged with the two first tapered recesses and the two second tapered recesses. Each clamping member has a threading ring mounted thereto and the four threading rings are engaged with inner threaded portions of the first tapered recesses and the second tapered recesses.

The object of the present invention is to provide a frame for a motorbike front fork and the two legs of the front fork are securely engaged with the two boards of the frame by tapered clamping members cooperated with threading rings which is engaged with holes in the two boards.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENT

Figure 1:
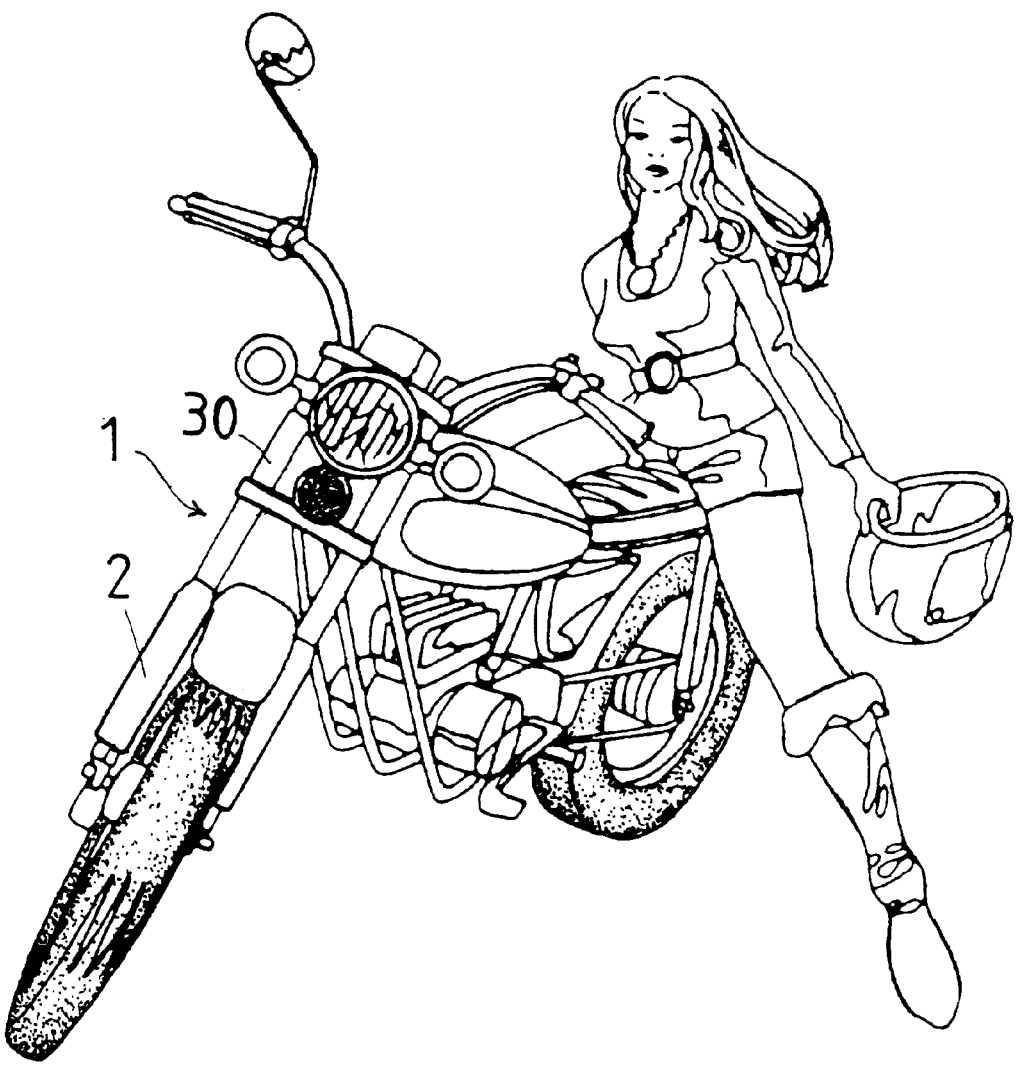
FIG. 1 is an illustrative view to show a motorbike with a front fork frame of the present invention.
Figure 2:
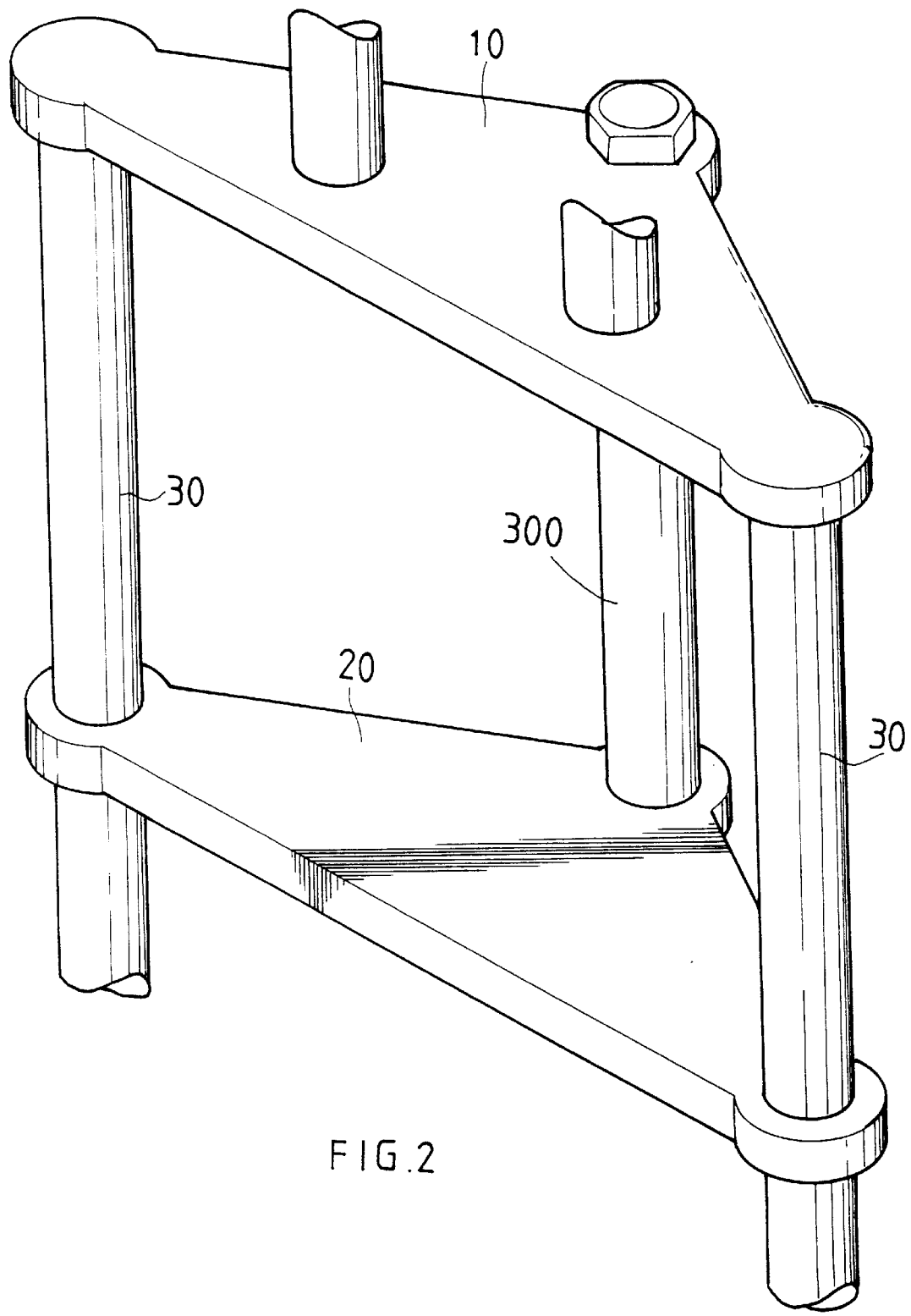
FIG. 2 is a perspective view to show the frame of the present invention.
Figure 3:
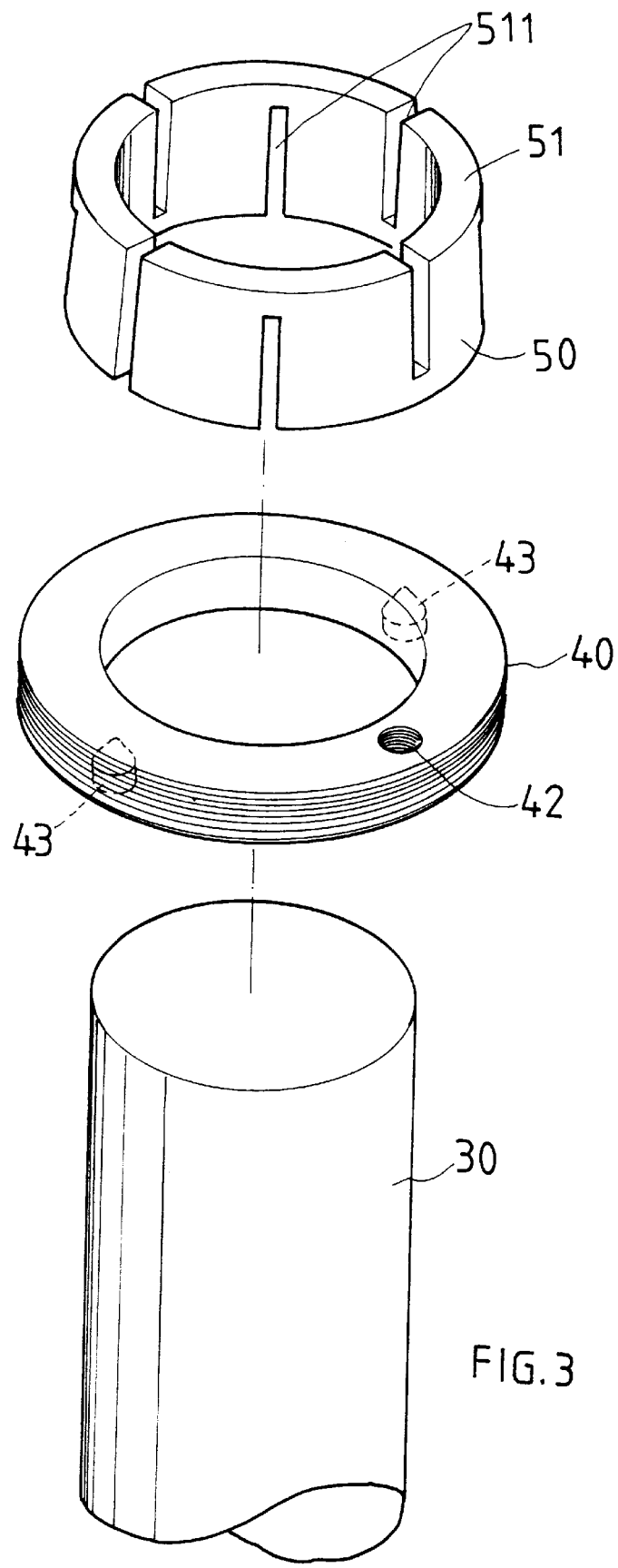
FIG. 3 is an exploded view to show a clamping member, a threading ring and a leg of the front fork.
Figure 4:
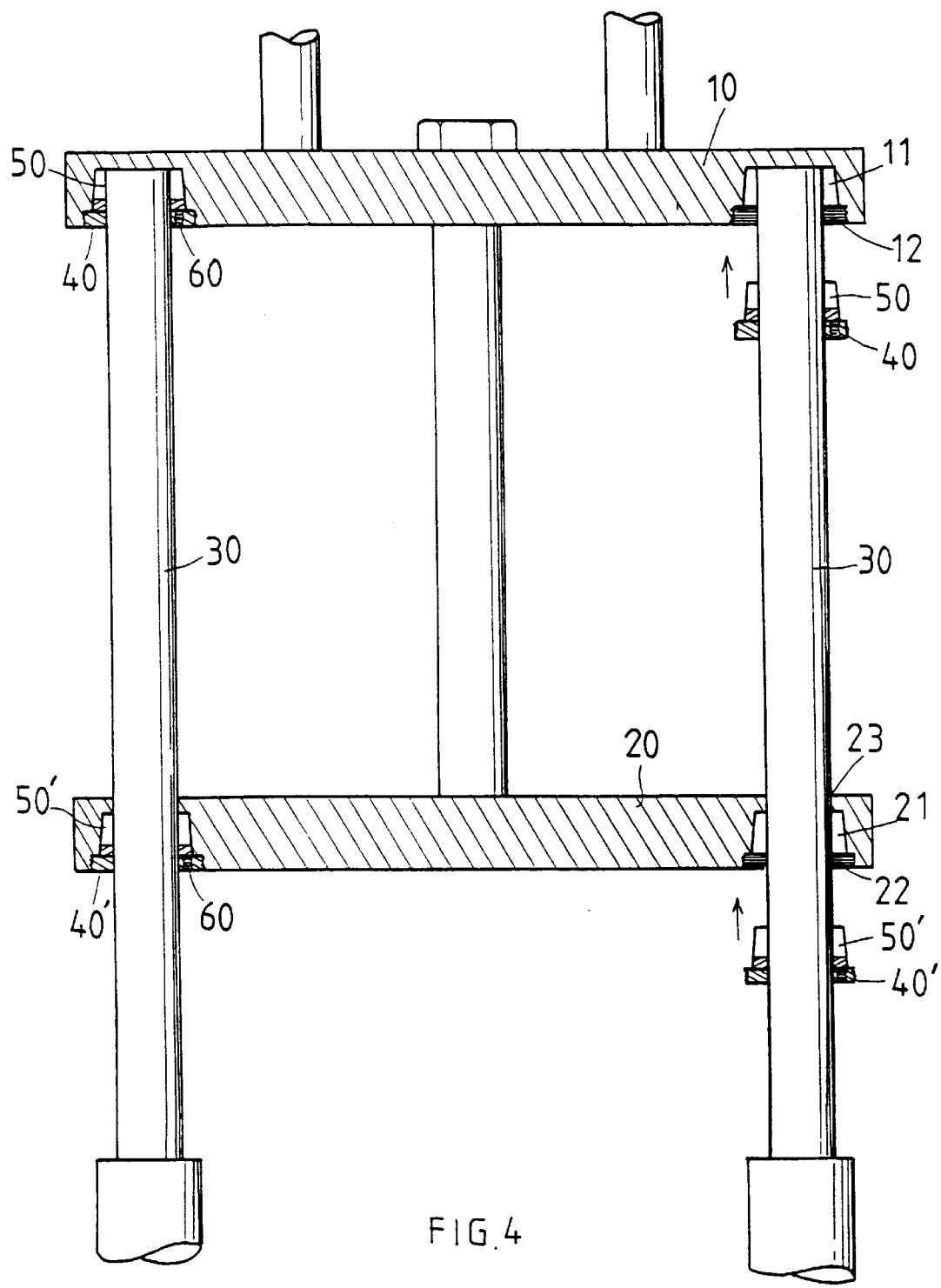
FIG. 4 is a side elevational view, partly in section, of the frame with two legs connected thereto, wherein two tapered members and two threading rings on one of the two legs are not engaged with the tapered recesses in the two boards.

Referring to FIGS. 1 to 4, a motorbike has a front fork 1 having two legs 30 and a handlebar assembly is connected to a top of the front fork 1 and two suspension cylinders 2 are connected to a lower end of the front fork 1. A frame in accordance with the present invention comprises a first board 10 and a second board 20 which is connected to the first board 10 by a connection rod 300. Two first tapered recesses 11 are defined in a bottom of the first board 10 and a first inner threaded portion 12 is defined in an inner periphery of each first tapered recess 11. The two first tapered recesses 11 receive two ends of the two legs 30 of the front fork 1 respectively. The second board 20 has two holes 23 defined therethrough so that the two legs 30 extend through the two holes 23. Two second tapered recesses 21 are defined in a bottom of the second board 20 and respectively communicate with the two holes 23. A second inner threaded portion 22 is defined in an inner periphery of each second tapered recess 21.

Figure 5:
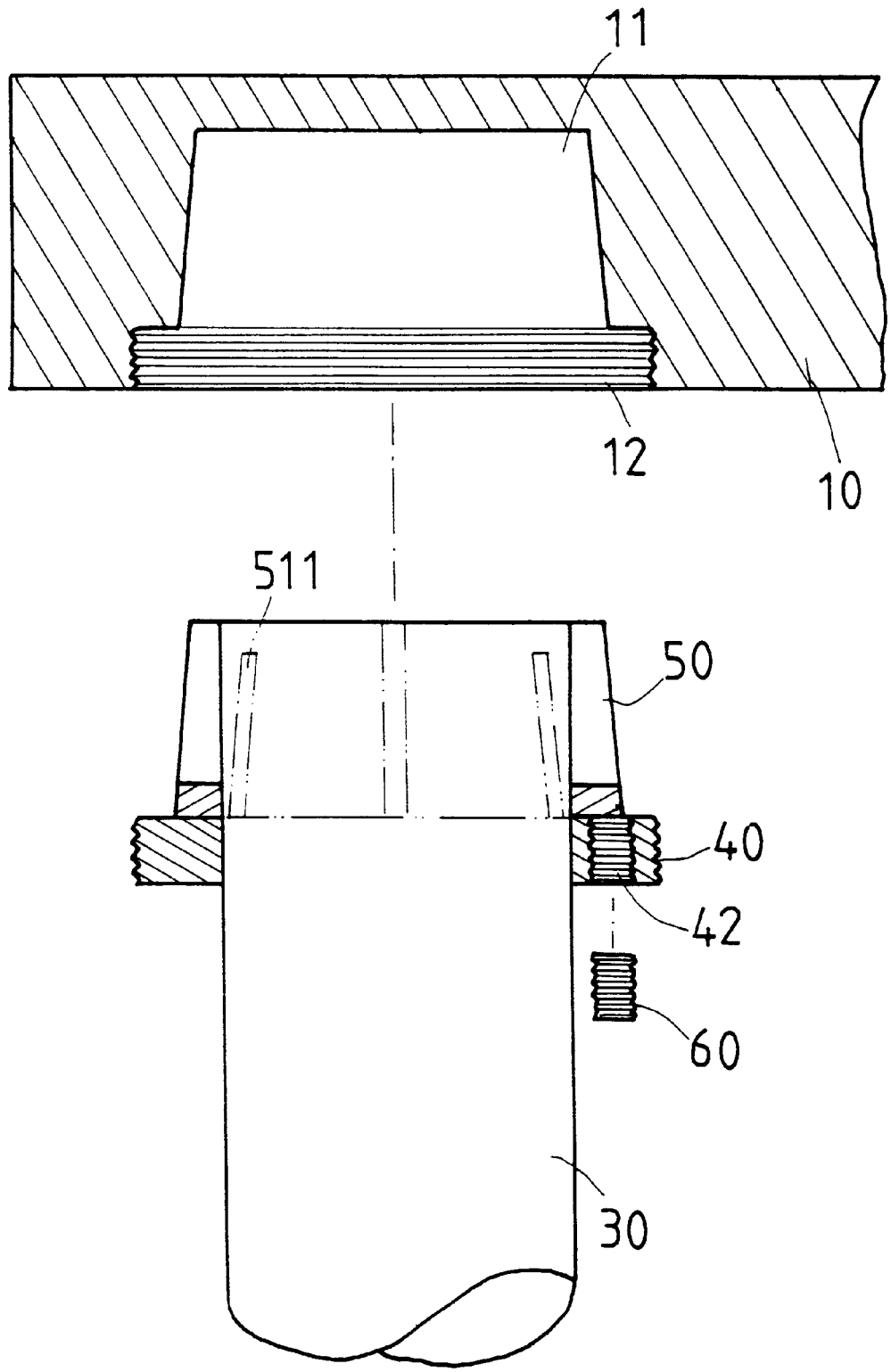
FIG. 5 is an exploded view to show a leg with a tapered clamping member and a threading ring mounted thereto, and a tapered recess in a board.
Figure 6:
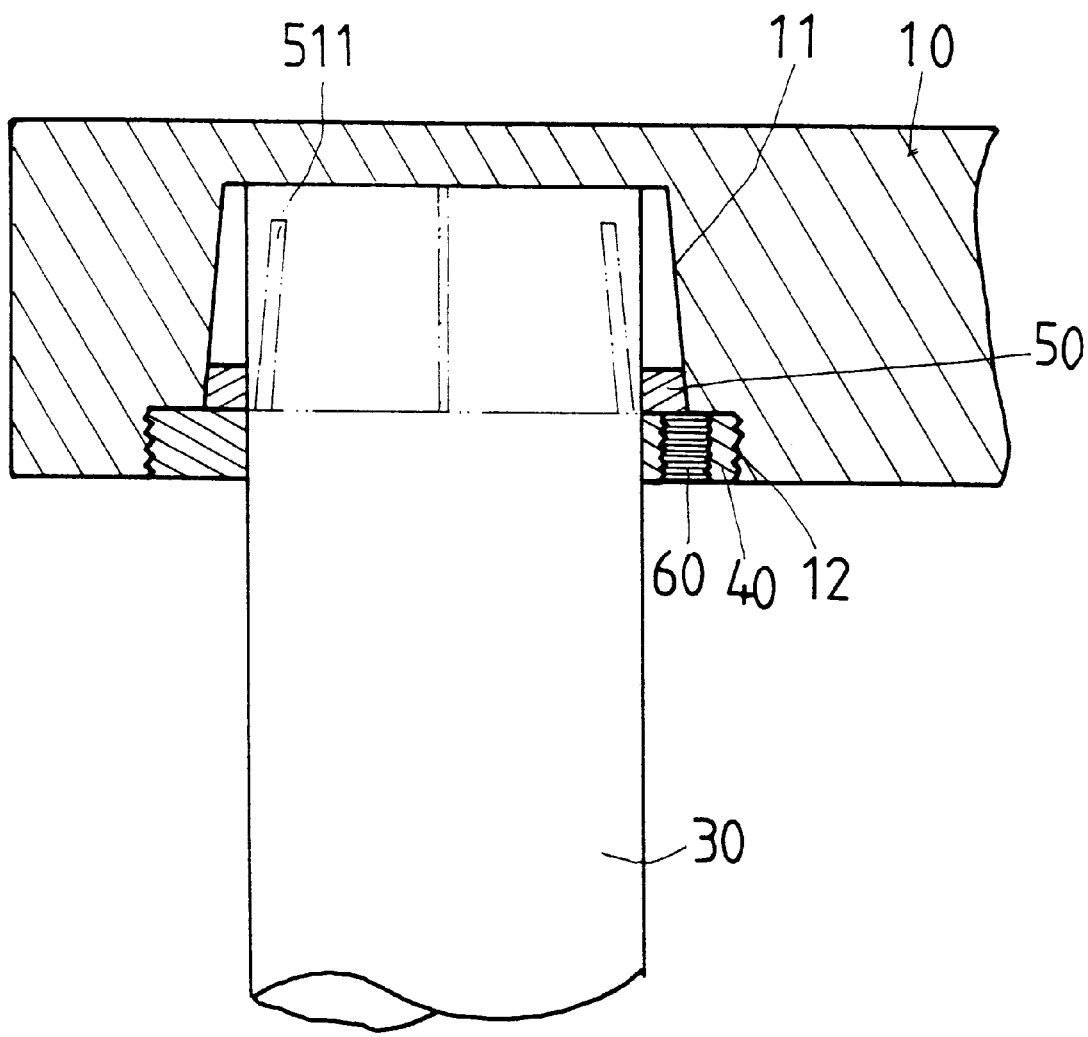
FIG. 6 is a side elevational view, partly in section, of the engagement of the tapered recess in a board and the tapered clamping member and the threading ring mounted to the clamping member is threadedly engaged with the inside of the tapered recess.
Figure 7:
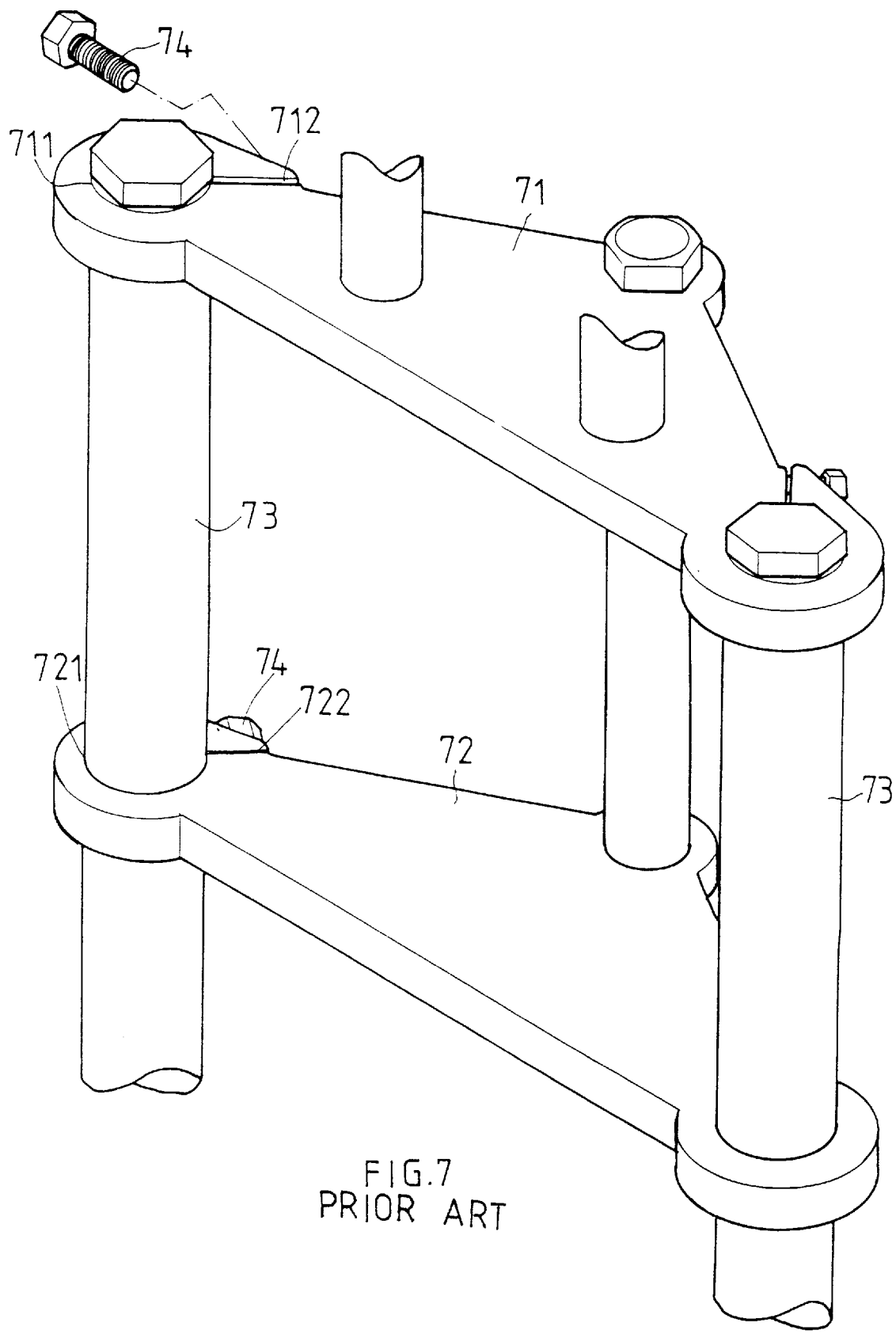
FIG. 7 is a perspective view to show a conventional frame with two legs of a front fork connected thereto.

Further referring to FIGS. 5 and 6, two first clamping members 50 are respectively engaged with the two first tapered recesses 11 and mounted to the two legs 30. Each of the first clamping members 50 is a C-shaped ring which has a tapered outside so as to match with the first tapered recesses 11. A plurality of notches 511 are defined in two ends of each first clamping member 50 and the notches 511 on the two ends are located alternatively. Two first threading rings 40 are respectively mounted to the two first clamping members 50 and engaged with the two first inner threaded portions 12. Therefore, the tapered clamping members 50 will be narrowed when the threading rings 40 are engaged with the first inner threaded portions 12. A threaded hole 42 is defined through each of the first threading rings 40 and so that a screw 60 is engaged with the threaded hole 42 and contacts the first clamping member 50. Each of the first threading rings 40 has two concavities 43 on a bottom thereof so as to be engaged with a tool (not shown) to rotate the first threading ring 40.

Two second clamping members 50' having the same structure as the first clamping members 50 are respectively engaged with the two second tapered recesses 21 and mounted to the two legs 30. Two second threading rings 40' having the same structure as the first threading rings 40 are respectively mounted to the two second clamping members 50', and are engaged with the two second inner threaded portions 22 so as to securely position the two legs 30 relative to the second board 20. Two screws 60 respectively extend through the two second threading rings 40' and contact the second clamping members 50'.

The tapered clamping members are securely engaged with the tapered recesses in the two boards and clamp the two legs of the front fork. The screws and the threading rings ensure the clamping members to be located at their position with regardless of vibration due to riding on a serrated road.

While we have shown and described various embodiments in accordance with the present invention, it should be clear to those skilled in the art that further embodiments may be made without departing from the scope and spirit of the present invention.

What is claimed is:

1. A frame for a motorbike front fork which has two legs, comprising:

a first board and a second board which is connected to said first board by a connection rod, two first tapered recesses defined in a bottom of said first board and a first inner threaded portion defined in an inner periphery of each first tapered recess, said two first tapered recesses adapted to receive two ends of the two legs of the front fork, said second board having two holes defined therethrough, two second tapered recesses defined in a bottom of said second board and respectively communicating with said two holes, a second inner threaded portion defined in an inner periphery of each second tapered recess, said two holes of said second board adapted to be extended through by the two legs, and two first clamping members respectively engaged with said two first tapered recesses and adapted to be mounted to the two legs, two first threading rings respectively mounted to said two first clamping members and engaged with said two first inner threaded portions, two second clamping members respectively engaged with said two second tapered recesses and adapted to be mounted to the two legs, two second threading rings respectively mounted to said two second clamping members and engaged with said two second inner threaded portions.

2. The frame as claimed in claim 1, wherein each of said first clamping members and each of said second clamping members are a C-shaped ring which has a tapered outside.

3. The frame as claimed in claim 2 further comprising a plurality of notches defined in one of two ends of each first clamping member and each second clamping member.

4. The frame as claimed in claim 1 further comprising a threaded hole defined through each of said first threading rings and each of said second threading rings, a screw engaged with said threaded hole and contacting said first/second clamping member.

* * * * *